United States Patent
Symanow et al.

(10) Patent No.: US 10,800,278 B2
(45) Date of Patent: Oct. 13, 2020

(54) VEHICLE LOW-VOLTAGE ENERGY SYSTEM CONTROL

(71) Applicant: Ford Global Technologies, LLC, Dearborn, MI (US)

(72) Inventors: David A. Symanow, Plymouth, MI (US); Michael Adel Awad Alla, Novi, MI (US); Ray Siciak, Ann Arbor, MI (US); Vincent J. Boscheratto, Allen Park, MI (US); Hamed Babazadehrokni, Livonia, MI (US); Robert Brown, Flint, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 209 days.

(21) Appl. No.: 16/002,121

(22) Filed: Jun. 7, 2018

(65) Prior Publication Data
US 2019/0375298 A1   Dec. 12, 2019

(51) Int. Cl.
*B60L 53/24* (2019.01)
*B60L 1/00* (2006.01)
*B60L 58/13* (2019.01)

(52) U.S. Cl.
CPC .............. *B60L 53/24* (2019.02); *B60L 1/00* (2013.01); *B60L 58/13* (2019.02); *B60L 2210/10* (2013.01)

(58) Field of Classification Search
CPC .. B60L 53/24; B60L 58/13; B60L 1/00; B60L 2210/10; B60L 58/20; B60L 50/61
USPC ......................................................... 701/22
See application file for complete search history.

(56) References Cited

U.S. PATENT DOCUMENTS

| | | | |
|---|---|---|---|
| 9,224,255 B2 | 12/2015 | Yagi et al. | |
| 9,425,647 B2 | 8/2016 | Nomoto | |
| 9,670,868 B2 | 6/2017 | Hirano | |
| 9,764,702 B2 | 9/2017 | Planas et al. | |
| 2015/0274027 A1* | 10/2015 | Crombez | B60L 11/1853 701/22 |
| 2018/0029474 A1* | 2/2018 | Berels | B60L 58/21 |

FOREIGN PATENT DOCUMENTS

CN            107244244 A      10/2017

* cited by examiner

*Primary Examiner* — Maceeh Anwari
(74) *Attorney, Agent, or Firm* — Frank A. MacKenzie; Bejin Bieneman PLC (57) ABSTRACT

A vehicle includes a low-voltage battery electrically coupled to a powertrain, and a computer programmed to put the vehicle in a minimal risk condition in response to a state of charge of the low-voltage battery falling below a threshold. The vehicle may further include a DC/DC converter electrically coupled to the powertrain and to the low-voltage battery, and a high-voltage battery electrically coupled to the powertrain.

12 Claims, 8 Drawing Sheets

VEHICLE LOW-VOLTAGE ENERGY SYSTEM CONTROL

BACKGROUND

Hybrid-electric, electric, and conventional (internal-combustion engine) vehicles typically include a power system for supplying power to various loads. The power system typically includes a low-voltage battery, e.g., 12 or 48 volts, which can supply energy to the loads. In a hybrid-electric vehicle, the power system includes a DC/DC converter that supplies power to the loads unless the power demanded by the loads exceeds the capacity of the DC/DC converter, in which case the low-voltage battery supplies the loads. In the event that the state of energy of the low-voltage battery is drawn down sufficiently far, the low-voltage battery may not have sufficient energy remaining to power the loads during an emergency maneuver by the vehicle.

DETAILED DESCRIPTION

A power system as described herein can maintain the ability of a low-voltage battery to supply power to loads of a vehicle in the event of an emergency maneuver. The power system can ensure that the low-voltage battery has sufficient energy to perform a minimal risk condition (described below) even if a power supply failure has occurred. This can increase the safety and reliability of the vehicle. For example, the vehicle may preemptively perform a minimal risk condition while the low-voltage battery still has the energy to do so. Moreover, the operational load shedding strategy described below for the power system can reduce a likelihood of a halt of the vehicle. The operational load shedding strategy can provide a cost and weight reduction for the vehicle by requiring a smaller low-voltage battery and/or a smaller DC/DC converter.

A system for the vehicle includes a low-voltage battery electrically coupled to a powertrain, and a computer programmed to put the vehicle in a minimal risk condition in response to a state of charge of the low-voltage battery falling below a threshold.

Putting the vehicle in a minimal risk condition may include driving the vehicle to a halt at a roadside.

The threshold may be equal to at least a sum of a total energy to complete a worst-case minimal risk condition and a minimum energy at which the low-voltage battery can supply the vehicle for the worst-case minimal risk condition.

The threshold may be a first threshold, and the computer may be further programmed to reduce energy supplied to a plurality of loads by the low-voltage battery in response to the state of charge of the low-voltage battery falling below a second threshold, and the second threshold may be greater than the first threshold. The computer may be further programmed to recharge the low-voltage battery in response to the state of charge of the low-voltage battery falling below a third threshold, and the third threshold may be greater than the second threshold.

The system may further include the powertrain. The system may further include a DC/DC converter electrically coupled to the powertrain and to the low-voltage battery.

The system may further include a high-voltage battery electrically coupled to the powertrain.

A computer includes a processor and a memory storing processor-executable instructions, and the processor is programmed to put a vehicle in a minimal risk condition in response to a state of charge of a battery falling below a threshold, and the battery is a low-voltage battery electrically connected to a powertrain of the vehicle.

Putting the vehicle in a minimal risk condition may include driving the vehicle to a halt at a roadside.

The threshold may be equal to at least a sum of a total energy to complete a worst-case minimal risk condition and a minimum energy at which the low-voltage battery can supply the vehicle for the worst-case minimal risk condition.

The threshold may be a first threshold, and the processor may be further programmed to reduce energy supplied to a plurality of loads by the low-voltage battery in response to the state of charge of the low-voltage battery falling below a second threshold, and the second threshold may be greater than the first threshold. The processor may be further programmed to recharge the low-voltage battery in response to the state of charge of the low-voltage battery falling below a third threshold, and the third threshold may be greater than the second threshold.

A method includes putting a vehicle in a minimal risk condition in response to a state of charge of a battery falling below a threshold, and the battery is a low-voltage battery electrically connected to a powertrain of the vehicle.

Putting the vehicle in a minimal risk condition may include driving the vehicle to a halt at a roadside.

The threshold may be equal to at least a sum of a total energy to complete a worst-case minimal risk condition and a minimum energy at which the low-voltage battery can supply the vehicle for the worst-case minimal risk condition.

The threshold may be a first threshold, and the method may further include reducing energy supplied to a plurality of loads by the low-voltage battery in response to the state of charge of the low-voltage battery falling below a second threshold, and the second threshold may be greater than the first threshold. The method may further include recharging the low-voltage battery in response to the state of charge of the low-voltage battery falling below a third threshold, and the third threshold is greater than the second threshold.

With reference to the Figures, a vehicle 30 includes at least one low-voltage battery 32 electrically coupled to a powertrain 34, and a computer 36 programmed to put the vehicle 30 in a minimal risk condition in response to a state of charge of the low-voltage battery 32 falling below a threshold.

Figure 1:
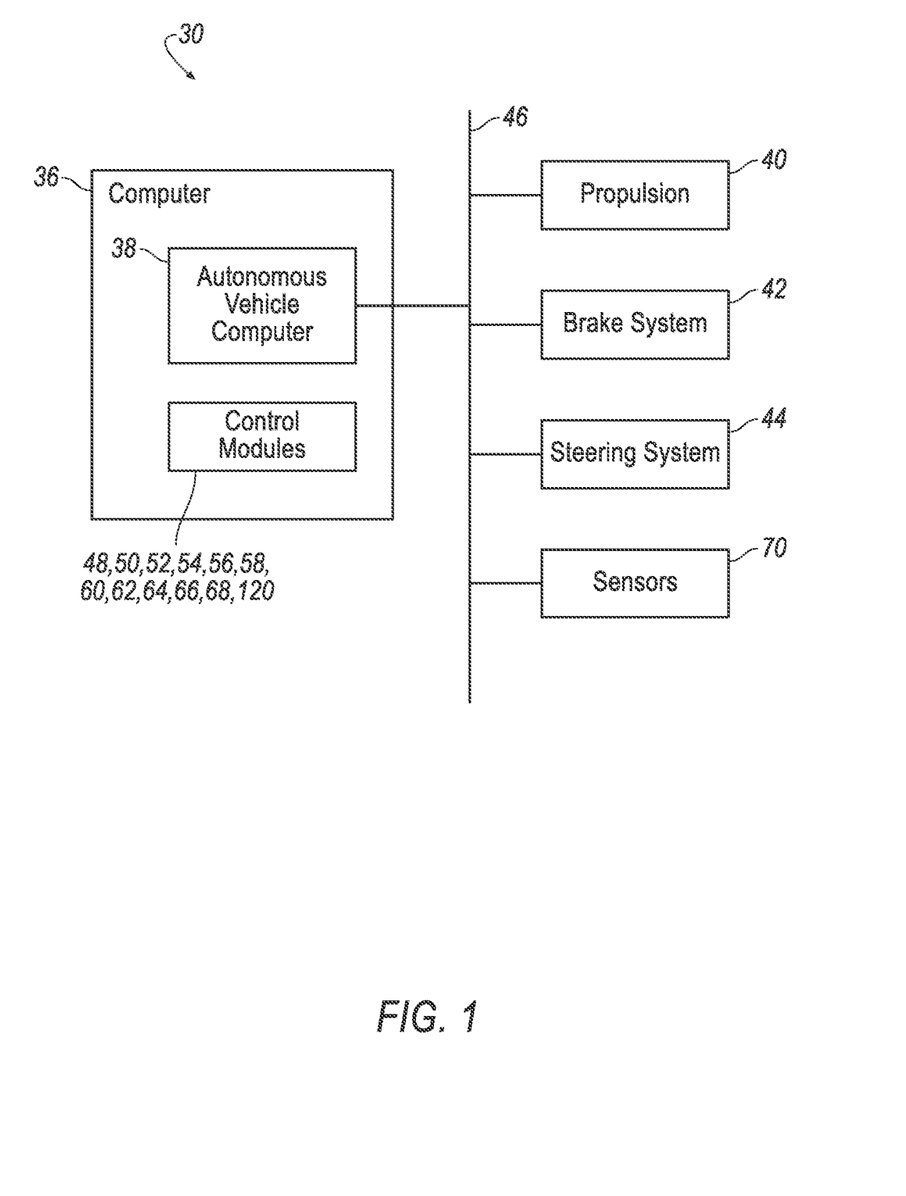
FIG. 1 is a block diagram of an example vehicle.

With reference to FIG. 1, the vehicle 30 may be an autonomous or semi-autonomous vehicle. An autonomous-vehicle computer 38 can be programmed to operate the vehicle 30 independently of the intervention of a human driver, completely or to a lesser degree. The autonomous-vehicle computer 38 may be programmed to operate a propulsion 40, brake system 42, steering system 44, and/or other vehicle systems. For the purposes of this disclosure, autonomous operation means the autonomous-vehicle computer 38 controls the propulsion 40, brake system 42, and steering system 44 without input from a human driver; semi-autonomous operation means the autonomous-vehicle computer 38 controls one or two of the propulsion 40, brake system 42, and steering system 44 and a human driver controls the remainder; and nonautonomous operation means a human driver controls the propulsion 40, brake system 42, and steering system 44.

The autonomous-vehicle computer 38 is a microprocessor-based computer. The autonomous-vehicle computer 38 includes a processor, memory, etc. The memory of the autonomous-vehicle computer 38 includes memory for storing instructions executable by the processor as well as for electronically storing data and/or databases.

The computer 36 is one or more microprocessor-based computers. The computer 36 includes memory, at least one processor, etc. The memory of the computer 36 includes memory for storing instructions executable by the processor as well as for electronically storing data and/or databases. The computer 36 may be the same computer as the autonomous-vehicle computer 38, or the computer 36 may be one or more separate computers in communication with the autonomous-vehicle computer 38 via a communications network 46, or the computer 36 may encompass multiple computers including the autonomous-vehicle computer 38. As a separate computer, the computer 36 may be or include, e.g., one or more electronic control units or modules (ECU or ECM) such as a hybrid-powertrain control module 48 and/or a battery-energy control module 50. Other ECMs may include a body control module 52, an antilock brake control module 54, a first power-steering control module 56, a second power-steering control module 120, a collision-mitigation-system control module 58, an autonomous-vehicle platform-interface control module 60, an engine control module 62, an object-detection maintenance control module 64, a restraint control module 66, and an accessory control module 68 (shown in FIGS. 3A-C).

The computer 36 may transmit and receive data through the communications network 46, which may be a controller area network (CAN) bus, Ethernet, WiFi, Local Interconnect Network (LIN), onboard diagnostics connector (OBD-II), and/or by any other wired or wireless communications network. The computer 36 may be communicatively coupled to the autonomous-vehicle computer 38, the other ECMs 48, 50, 52, 54, 56, 58, 60 62, 64, 66, 68, the propulsion 40, the brake system 42, the steering system 44, sensors 70, and other components via the communications network 46.

The sensors 70 may provide data about operation of the vehicle 30, for example, wheel speed, wheel orientation, and engine and transmission data (e.g., temperature, fuel consumption, etc.). The sensors 70 may detect the location and/or orientation of the vehicle 30. For example, the sensors 70 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 70 may detect the external world, e.g., objects and/or characteristics of surroundings of the vehicle 30, such as other vehicles, road lane markings, traffic lights and/or signs, pedestrians, etc. For example, the sensors 70 may include radar sensors, scanning laser range finders, light detection and ranging (LIDAR) devices, and image processing sensors such as cameras. The sensors 70 may include communications devices, for example, vehicle-to-infrastructure (V2I) or vehicle-to-vehicle (V2V) devices.

Figure 2:
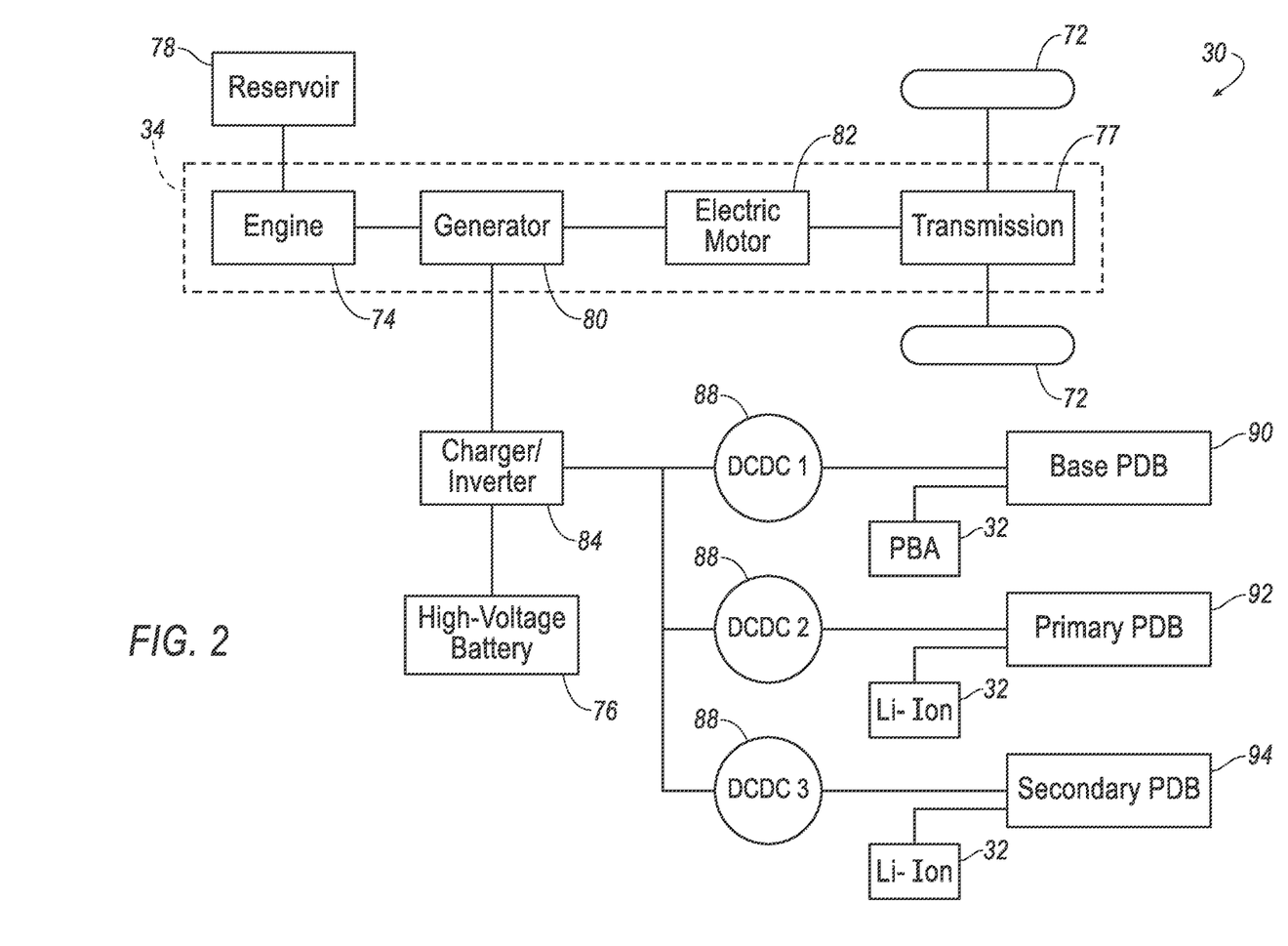
FIG. 2 is a block diagram of an example propulsion system of the vehicle of FIG. 1.

The propulsion 40 of the vehicle 30 generates energy and translates the energy into motion of the vehicle 30. In particular, the propulsion 40 may be hybrid propulsion. The propulsion 40 may include the powertrain 34 in any hybrid arrangement, e.g., a series-hybrid powertrain (as shown in FIG. 2), a parallel-hybrid powertrain, a power-split (series-parallel) hybrid powertrain, etc. The propulsion 40 is described in more detail below with respect to FIG. 2. The propulsion 40 can include an electronic control unit (ECU) or the like that is in communication with and receives input from the autonomous-vehicle computer 38 and/or a human driver, e.g., the hybrid-powertrain control module 48. The human driver may control the propulsion 40 via, e.g., an accelerator pedal and/or a gear-shift lever.

The brake system 42 is typically a conventional vehicle braking subsystem and resists the motion of the vehicle 30 to thereby slow and/or stop the vehicle 30. The brake system 42 may include friction brakes such as disc brakes, drum brakes, band brakes, etc.; regenerative brakes; any other suitable type of brakes; or a combination. The brake system 42 can include an electronic control unit (ECU) or the like that is in communication with and receives input from the autonomous-vehicle computer 38 and/or a human driver, e.g., the antilock brake control module 54. The human driver may control the brake system 42 via, e.g., a brake pedal.

The steering system 44 is typically a conventional vehicle steering subsystem and controls the turning of wheels 72. The steering system 44 may be a rack-and-pinion system with electric power-assisted steering, a steer-by-wire system, as both are known, or any other suitable system. The steering system 44 can include an electronic control unit (ECU) or the like that is in communication with and receives input from the autonomous-vehicle computer 38 and/or a human driver, e.g., the first and/or second power-steering control modules 56, 120. The human driver may control the steering via, e.g., a steering wheel.

With reference to FIG. 2, the propulsion 40 includes the powertrain 34 that transmits power from an engine 74, from a high-voltage battery 76, or from both the engine 74 and the high-voltage battery 76, to a transmission 77 and ultimately to the wheels 72 of the vehicle 30. The engine 74 is an internal-combustion engine and may contain cylinders that serve as combustion chambers that convert fuel from a reservoir 78 to rotational kinetic energy. A generator 80 may receive the rotational kinetic energy from the engine 74. The generator 80 converts the rotational kinetic energy into electricity, e.g., alternating current, and powers an electric motor 82. A charger/inverter 84 may convert the output of the generator 80, e.g., the alternating current, into high-voltage direct current to supply the high-voltage battery 76 and a power-distribution system 86. For the purposes of this disclosure, "high voltage" is defined as at least 60 volts direct current or at least 30 volts alternating current. For example, the high-voltage direct current may be on the order of 400 volts. The charger/inverter 84 controls how much power is supplied from the high-voltage battery 76 to the generator 80 of the powertrain 34. The electric motor 82 may convert the electricity from the generator 80 into rotational kinetic energy transmitted to the transmission 77. The transmission 77 transmits the kinetic energy via, e.g., a drive axle to the wheels 72, while applying a gear ratio allowing different tradeoffs between torque and rotational speed.

The high-voltage battery 76 produces a voltage of at least 60 volts direct current, e.g., on the order of 400 volts direct current. The high-voltage battery 76 may be any type suitable for providing high-voltage electricity for operating the vehicle 30, e.g., lithium-ion, lead-acid, etc. The high-voltage battery 76 is electrically coupled to the powertrain 34 via the charger/inverter 84.

Figure 3A:
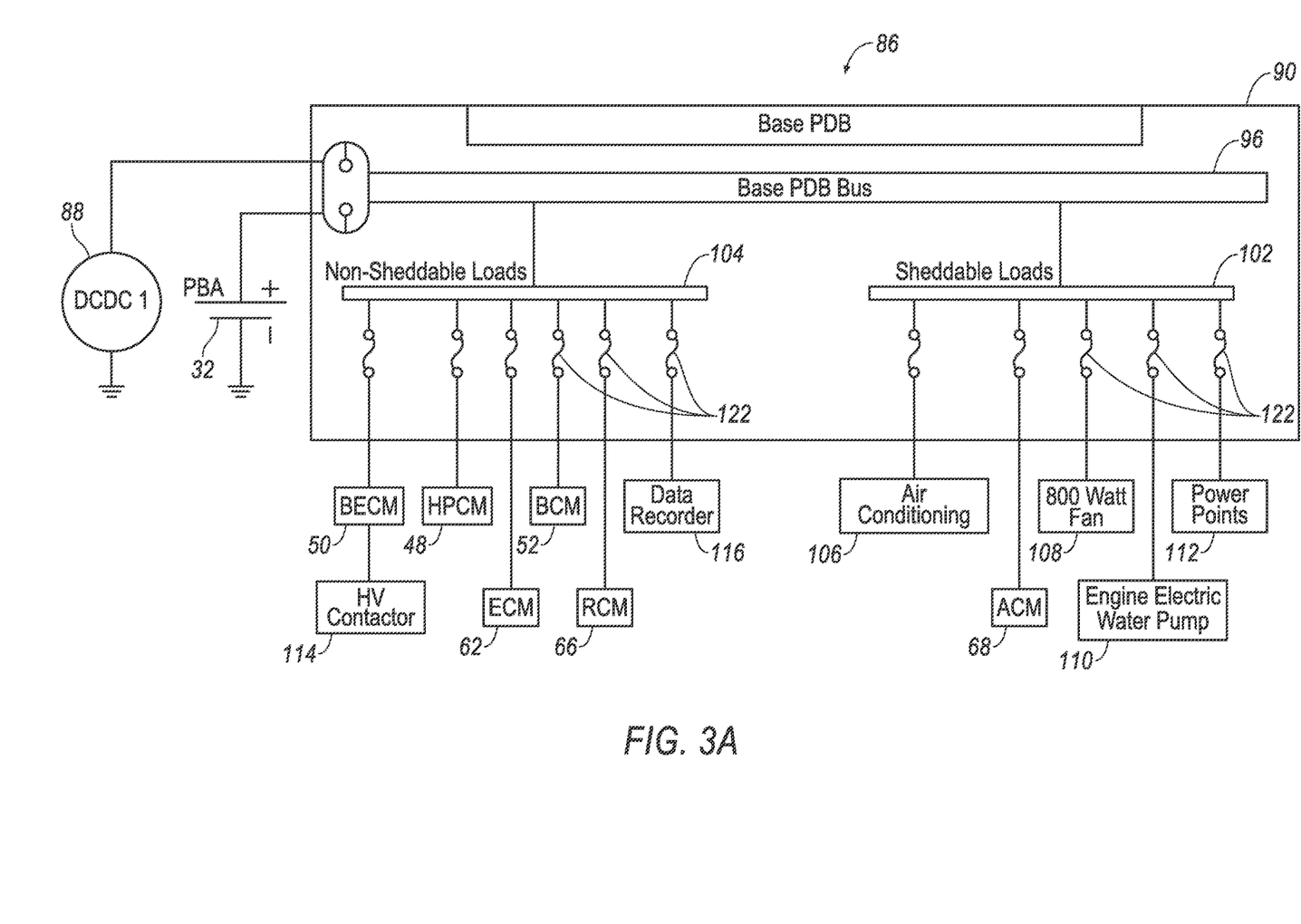
FIGS. 3A-C are circuit diagrams of an example power-distribution system of the vehicle of FIG. 1.
Figure 3B:
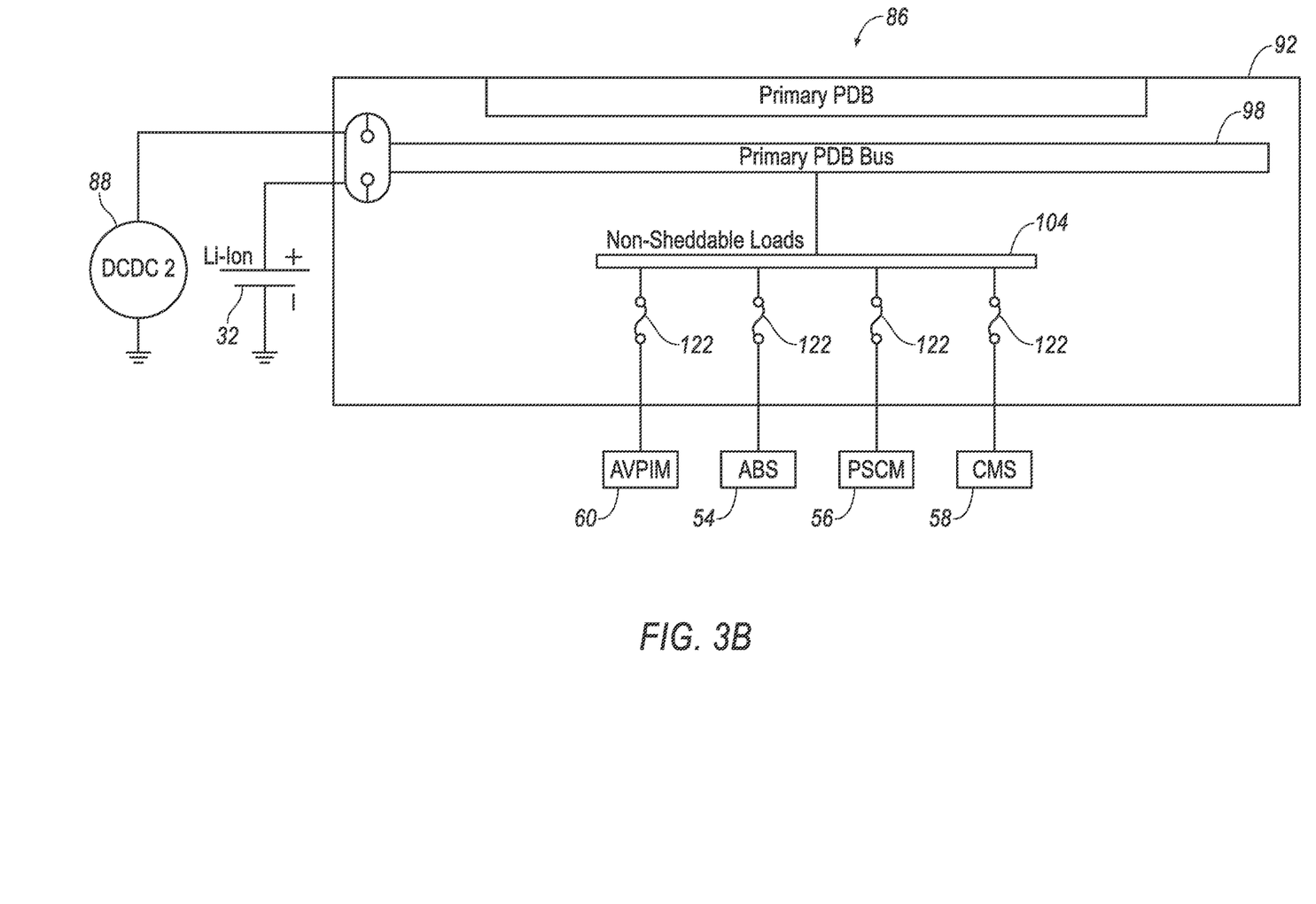
Figure 3C:
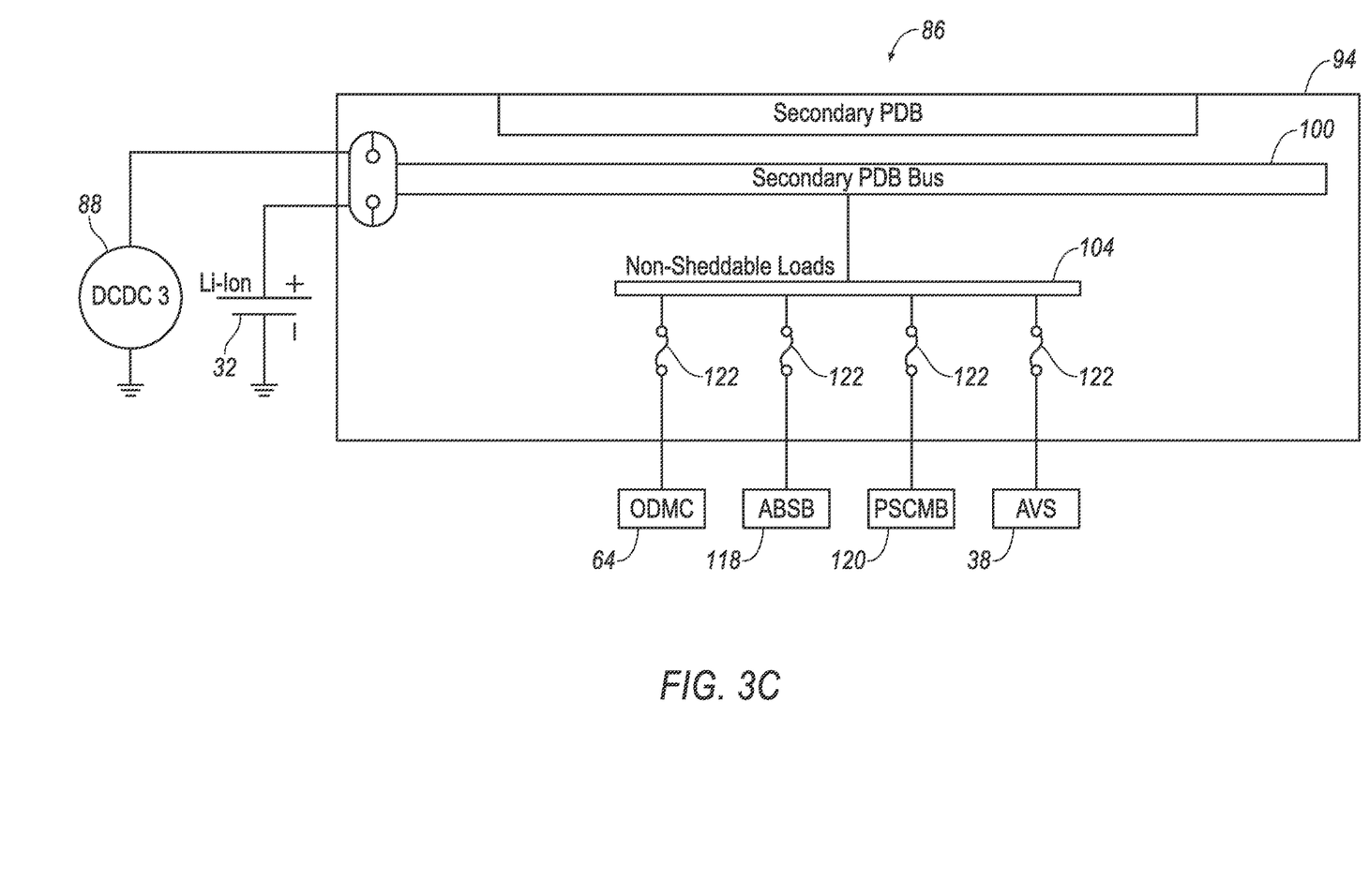

With reference to FIGS. 3A-C, the power-distribution system 86 may include a plurality of DC/DC converters 88. The DC/DC converters 88 are electrically coupled to the powertrain 34 via the charger/inverter 84 (as shown in FIG. 2) and to the low-voltage batteries 32. The DC/DC converters 88 may receive high-voltage direct current from the charger/inverter 84 and/or the high-voltage battery 76 and convert the high-voltage direct current to low-voltage direct current. For the purposes of this disclosure, "low voltage" is defined as less than 60 volts direct current or less than 30 volts alternating current. For example, the low-voltage direct current may be 12 volts or 48 volts. Each DC/DC converter 88 may exchange the low-voltage direct current with one of the low-voltage batteries 32, and each DC/DC converter 88 may supply the low-voltage direct current to one of a plurality of power-distribution-board buses 96, 98, 100.

A plurality of power-distribution boards 90, 92, 94 include a base power-distribution board 90, a primary power-distribution board 92, and a secondary power-distribution board 94. The power-distribution boards 90, 92, 94 divide electricity into subsidiary circuits, i.e., a plurality of loads 102, 104. The power-distribution boards 90, 92, 94 each include one of the power-distribution board buses and one or more fuses 122. The power-distribution-board buses 96, 98, 100 include a base power-distribution-board bus 96 in the base power-distribution board 90, a primary power-distribution-board bus 98 in the primary power-distribution board 92, and a secondary power-distribution-board bus 100 in the secondary power-distribution board 94.

The low-voltage batteries 32 each produces a voltage less than 60 volts direct current, e.g., 12 or 48 volts direct current. The low-voltage batteries 32 may be any type suitable for providing low-voltage electricity for power the loads 102, 104, e.g., lithium-ion, lead-acid, etc. For example, the low-voltage battery 32 electrically coupled to the base power-distribution board 90 is a lead-acid battery, and the low-voltage batteries 32 electrically coupled to the primary power-distribution board 92 and to the secondary power-distribution board 94 are lithium-ion batteries. The low-voltage batteries 32 are electrically coupled to the powertrain 34 via the respective DC/DC converter 88 and the charger/inverter 84.

The loads 102, 104 include sheddable loads 102 and nonsheddable loads 104. For the purposes of this disclosure, a "sheddable load" is defined as a load designated to be powered off when the loads 102, 104 demand more power than available, and a "nonsheddable load" is defined as a load designated to remain powered when the loads 102, 104 demand more power than available. The sheddable loads 102 may include, e.g., an air-conditioning system 106 or components or settings of the air-conditioning system 106 such as an AC fan or a high-speed mode; the accessory control module 68; a fan 108 for cooling the engine 74; an electric water pump 110 for the engine 74; and power points 112 (i.e., sockets in a passenger cabin for passengers to plug in personal devices), as shown in FIG. 3A. The nonsheddable loads 104 may include, e.g., the battery-energy control module 50, a high-voltage contactor 114 for the battery-energy control module 50 to control electricity flow to the DC/DC converters 88, etc., the hybrid-powertrain control module 48, the engine control module 62, the body control module 52, the restraint control module 66, a data recorder 116 (as all shown in FIG. 3A), the autonomous-vehicle platform-interface control module 60, the antilock brake control module 54, the power-steering control module 56, the collision-mitigation-system control module 58 (as all shown in FIG. 3B), the object-detection maintenance control module 64, an antilock-brake-system backup 118, the second power-steering control module 120, and the autonomous-vehicle computer 38.

In normal operation, the loads 102, 104 are typically powered via the DC/DC converters 88 without drawing power from the low-voltage batteries 32. The low-voltage batteries 32 supply power in the event of transient demands from the loads 102, 104 for greater power than the DC/DC converters 88 can supply.

Figure 4:
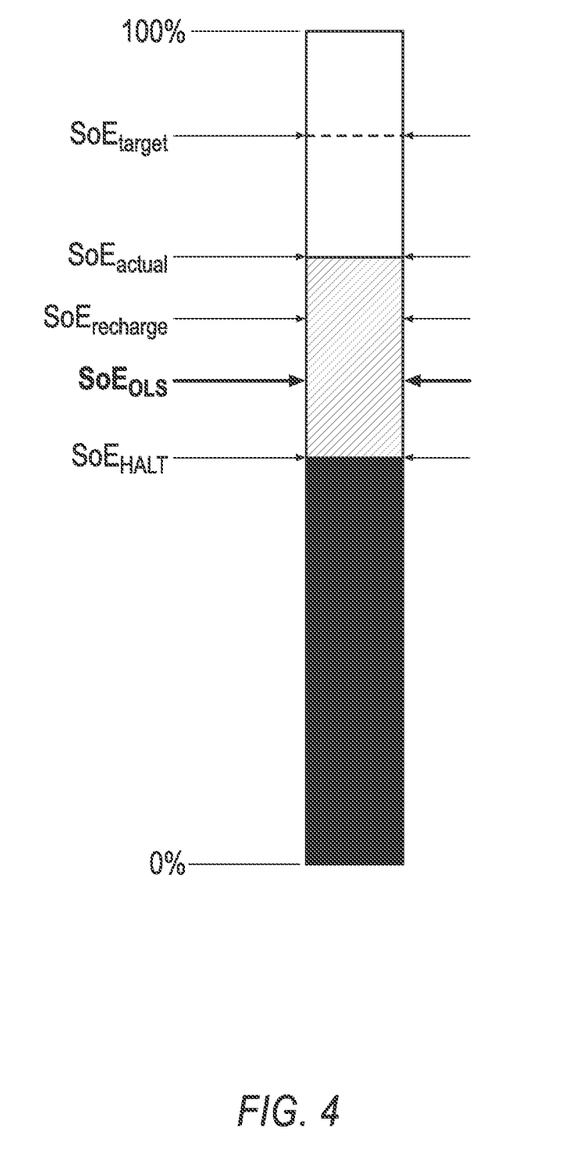
FIG. 4 is a diagram of a state of charge of a low-voltage battery of the power-distribution system of FIG. 3.

With reference to FIG. 4, the low-voltage batteries 32 each have a state of energy $SoE_{actual}$ that can vary between 0% (no remaining charge) and 100% (fully charged). The state of energy $SoE_{actual}$ may be measured by a battery monitor sensor (not shown) in communication with the computer 36.

A charge level $SoE_{target}$ is a maximum state of energy to which the low-voltage battery 32 will be charged in normal operation. The charge level $SoE_{target}$ may be chosen to balance a tradeoff between fuel economy and charging efficiency, among other factors. Battery charging can reduce fuel economy, and charging efficiency can decrease with higher values of $SoE_{target}$.

A charge level $SoE_{recharge}$ is a minimum state of energy before triggering a recharging process for the low-voltage battery 32. The charge level $SoE_{recharge}$ may be chosen based on an amount of energy needed to support key-off loads and to provide a safety factor above a minimum state of energy to which the low-voltage battery 32 can be discharged without damaging the low-voltage battery 32. The charge level $SoE_{target}$ is greater than the charge level $SoE_{recharge}$.

A charge level $SoE_{OLS}$ is a state of energy at which an operational load shedding strategy is implemented (described below with respect to a block 575 of a process 500). The charge level $SoE_{OLS}$ may be chosen based on tradeoffs among accuracy of the measurement of the state of energy $SoE_{actual}$ by the battery monitor sensor; temperature; and avoidance of customer dissatisfaction from perceptible loss of convenience features such as the air-conditioning system 106. The charge level $SoE_{recharge}$ is greater than the charge level $SoE_{OLS}$.

A charge level $SoE_{halt}$ is a state of energy at which the autonomous-vehicle computer 38 puts the vehicle 30 in a minimal risk condition. For purposes of this disclosure, that term has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, Automated Driving Systems 2.0: A Vision for Safety, at 26 (citing SAE International J3016, International Taxonomy and Definitions for Terms Related to Driving Automation Systems for On-Road Motor Vehicles (J3016:September2016)).) For example, the minimal risk condition may be initiating a handover to the human driver or autonomously driving the vehicle 30 to a halt at a roadside, i.e., stopping the vehicle 30 outside active lanes of traffic.

The charge level $SoE_{halt}$ may be chosen so that the low-voltage battery 32 is able to provide sufficient power for the minimal risk condition. The charge level $SoE_{halt}$ may be equal to at least a sum of a total energy to complete a worst-case minimal risk condition and a minimum energy at which the low-voltage battery 32 can supply the vehicle 30 for the worst-case minimal risk condition. For example, the charge level $SoE_{halt}$ may be given by this equation:

$$SoE_{halt} = \int_0^{t_{MRC}} E_{AV}(t)dt + SoE_{min\_op}$$

in which $t_{MRC}$ is a maximum duration of a worst-case minimal risk condition, $E_{AV}(t)$ is the energy expended at time t by the vehicle 30 as the vehicle 30 is put into a minimal risk condition, and $SoE_{min\_op}$ is a minimum state of energy at which the low-voltage battery 32 is able to supply energy at the level specified by $E_{AV}(t)$. The worst-case minimal risk condition is, from among the minimal risk conditions that the autonomous-vehicle computer 38 is programmed to perform, the minimal risk condition requiring the greatest amount of energy to perform. The charge level $SoE_{OLS}$ is greater than the charge level $SoE_{halt}$.

Figure 5A:
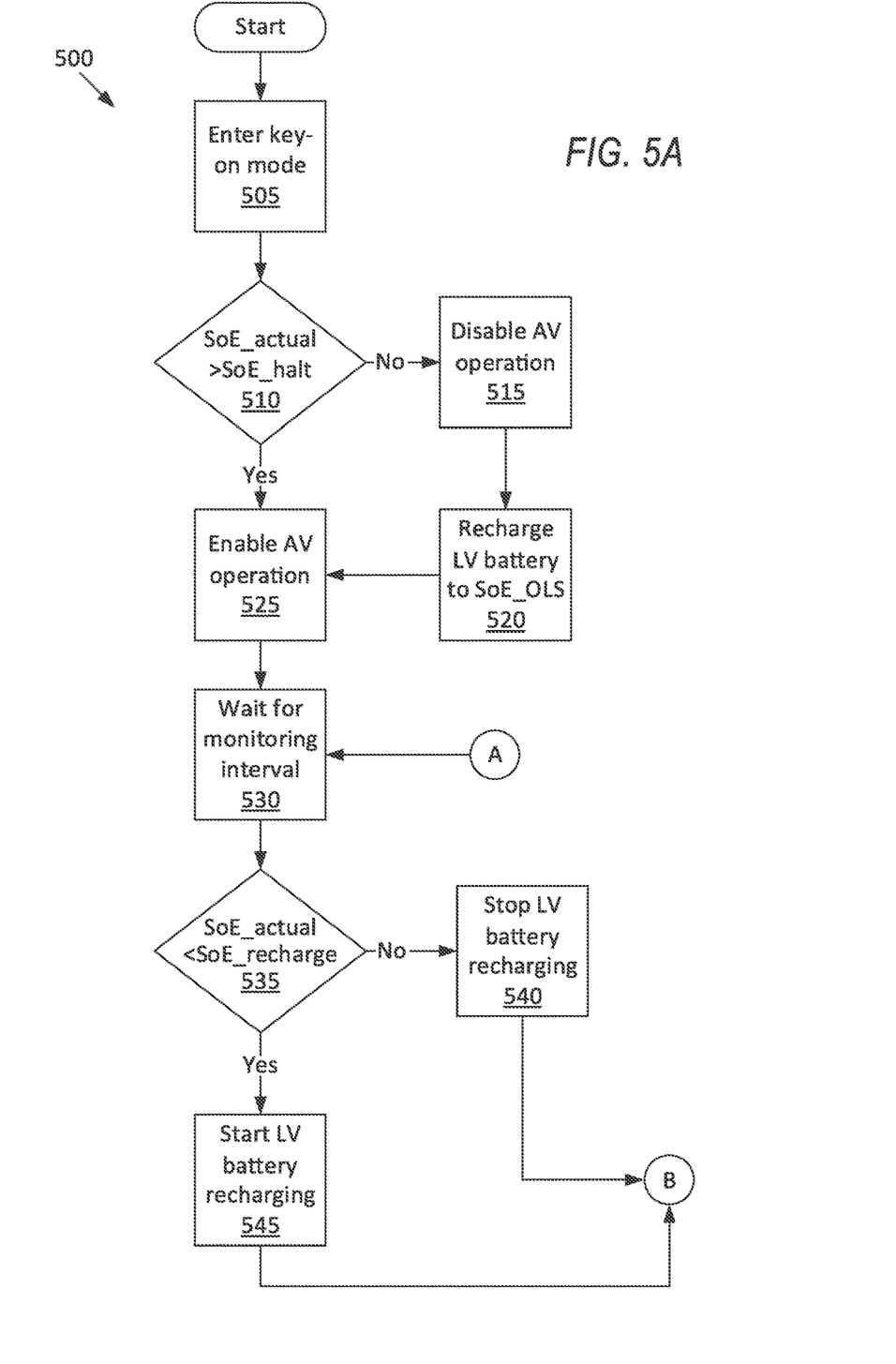
FIGS. 5A-B is a process flow diagram of an example process for controlling the vehicle of FIG. 1 based on a state of charge of the low-voltage battery.
Figure 5B:
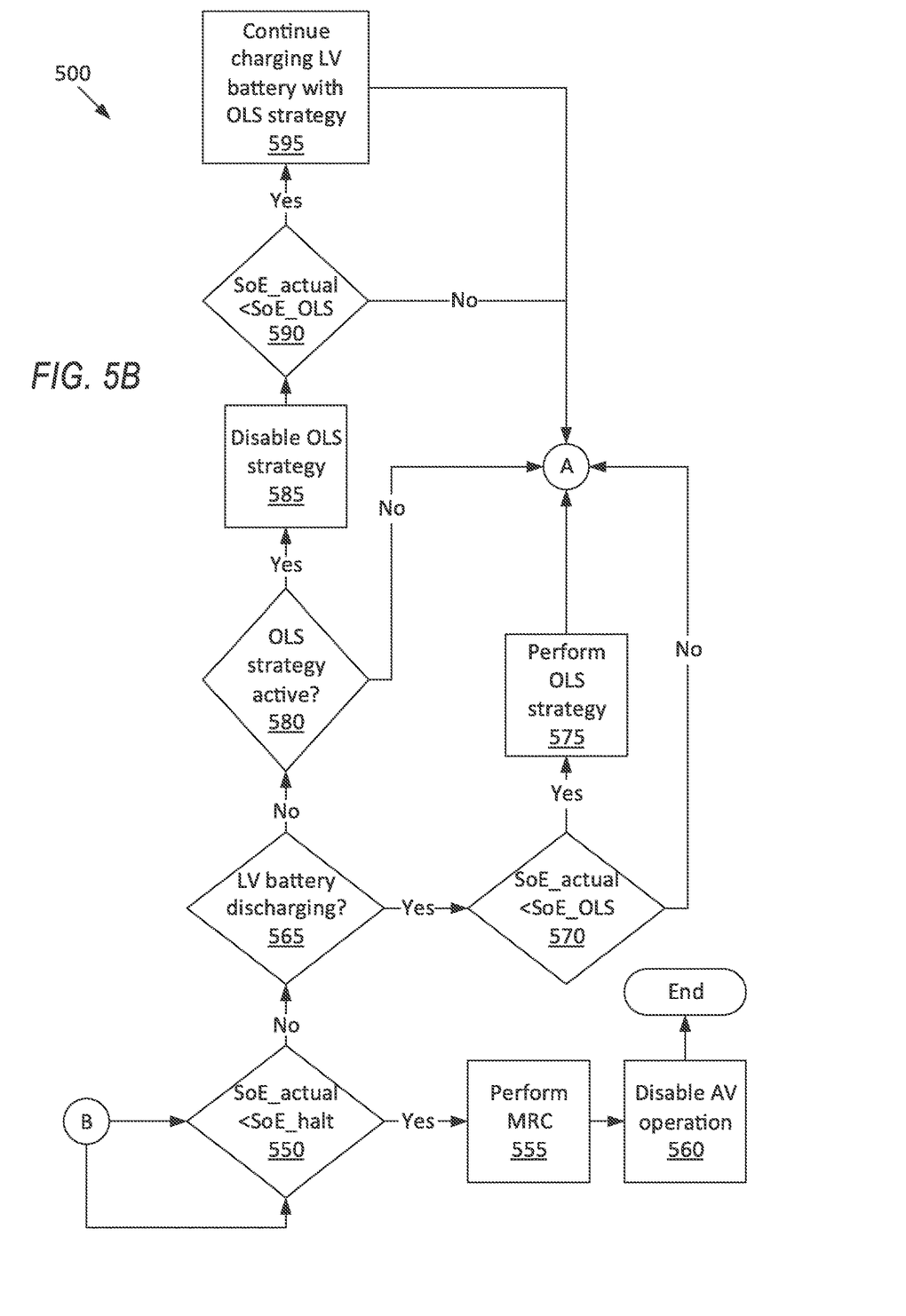

FIGS. 5A and 5B together show a process flow diagram illustrating an exemplary process 500 for controlling the vehicle 30 based on a charge level $SoE_{actual}$ of the low-voltage battery 32. The memory of the computer 36 stores executable instructions for performing the steps of the process 500. The process 500 may be separately run for each of the low-voltage batteries 32 individually.

In general, as described more fully below, in blocks 505-530, the computer 36 determines upon starting the vehicle 30 whether the state of charge $SoE_{actual}$ of the low-voltage battery 32 is below a first threshold, and if so, charges the low-voltage battery 32 to a second threshold. The first threshold is equal to the charge level $SoE_{halt}$, and the second threshold is equal to the charge level $SoE_{OLS}$. (The adjectives "first," "second," and "third" are used throughout this document as identifiers and are not intended to signify importance or order.) Blocks 530-595 recur at a preset monitoring interval. In the blocks 535-545, the computer 36 recharges the low-voltage battery 32 in response to the state of charge $SoE_{actual}$ falling below a third threshold. The third threshold is equal to the charge level $SoE_{recharge}$. In blocks 550-560, the vehicle 30 performs a minimal risk condition in response to the state of charge $SoE_{actual}$ falling below the first threshold, the charge level $SoE_{halt}$. In blocks 565-595, the computer 36 performs an operational load shedding strategy (described in more detail below with respect to the block 575) in response to the state of charge $SoE_{actual}$ falling below the second threshold, the charge level $SoE_{OLS}$, while the low-voltage battery 32 is discharging, and the computer 36 disables the operational load shedding strategy when the low-voltage battery 32 is no longer discharging.

The process 500 begins in a block 505, in which the vehicle 30 enters a key-on mode. The vehicle 30 may enter the key-on mode from a user starting an ignition of the vehicle 30.

Next, in a decision block 510, the computer 36 determines whether the state of charge $SoE_{actual}$ of the low-voltage battery 32 is greater than the charge level $SoE_{halt}$. In response to the state of charge $SoE_{actual}$ of the low-voltage battery 32 being greater than the charge level $SoE_{halt}$, the process 500 proceeds to a block 525.

In response to the state of charge $SoE_{actual}$ of the low-voltage battery 32 being less than the charge level $SoE_{halt}$, next, in a block 515, the computer 36 disables autonomous driving of the vehicle 30. The autonomous-vehicle computer 38 is prevented from driving the vehicle 30.

Next, in a block 520, the computer 36 recharges the low-voltage battery 32 to the charge level $SoE_{OLS}$. The power is supplied by the engine 74 or the electric motor 82 via the generator 80, the charger/inverter 84, and the respective DC/DC converter 88. The power demands on the low-voltage battery 32 during charging are kept down by the disabling of the autonomous driving of the vehicle 30.

Next, or after the decision block 510 in response to the state of charge $SoE_{actual}$ of the low-voltage battery 32 being greater than the charge level $SoE_{halt}$, in a block 525, the computer 36 enables autonomous driving of the vehicle 30. The autonomous-vehicle computer 38 is thus not prevented from driving the vehicle 30.

Next, in a block 530, the computer 36 waits for a preset monitoring interval. The monitoring interval is a length of time between checking the state of charge $SoE_{actual}$ of the low-voltage battery 32. The monitoring interval may be chosen to permit sufficient reaction time based on the state of charge $SoE_{actual}$ falling below one of the thresholds.

Next, in a decision block 535, the computer 36 determines whether the state of charge $SoE_{actual}$ of the low-voltage battery 32 is greater than the charge level $SoE_{recharge}$. In response to the state of charge $SoE_{actual}$ being less than the charge level $SoE_{recharge}$, the process 500 proceeds to a block 545.

In response to the state of charge $SoE_{actual}$ being greater than the charge level $SoE_{recharge}$, in a block 540, the computer 36 stops the recharging of the low-voltage battery 32 if ongoing. After the block 540, the process proceeds to a decision block 550.

After the decision block 535, in response to the state of charge $SoE_{actual}$ being less than the charge level $SoE_{recharge}$, in a block 545, the computer 36 recharges the low-voltage battery 32, either initiating or continuing the recharging.

Next, or after the block 540, in a decision block 550, the computer 36 determines whether the state of charge $SoE_{actual}$ of the low-voltage battery 32 is greater than the charge level $SoE_{halt}$. In response to the state of charge $SoE_{actual}$ of the low-voltage battery 32 being greater than the charge level $SoE_{halt}$, the process 500 proceeds to a decision block 565.

In response to the state of charge $SoE_{actual}$ of the low-voltage battery 32 being less than the charge level $SoE_{halt}$, in a block 555, the computer 36 puts the vehicle 30 in a minimal risk condition. For example, the minimal risk condition may be initiating a handover to the human driver or autonomously driving the vehicle 30 to a halt at a roadside, i.e., stopping the vehicle 30 outside active lanes of traffic. The computer 36 stores different types of minimal risk conditions paired with triggers, i.e., events that the computer 36 responds to with the respective minimal risk condition.

| Trigger | Minimal Risk Condition |
|---|---|
| Low tire pressure | Pull over at next designated stopping location |
| Tire blowout | Immediately drive to halt at roadside |
| $SoE_{actual} < SoE_{halt}$ | Immediately drive to halt at roadside |
| Impact imminent | Immediate maximum braking |
| . | . |
| . | . |
| . | . |

The minimal risk condition for a particular trigger may be chosen by balancing the risk of the trigger with the risk from performing the minimal risk condition. The autonomous-vehicle computer 38 may perform the minimal risk condition by using known autonomous-operation algorithms.

Next, in a block 560, the computer 36 disables autonomous driving of the vehicle 30. The autonomous-vehicle computer 38 is prevented from driving the vehicle 30. After the block 560, the process 500 ends.

In response to the state of charge $SoE_{actual}$ of the low-voltage battery 32 being greater than the charge level $SoE_{halt}$, after the decision block 550, in a decision block 565, the computer 36 checks whether the low-voltage battery 32 is discharging, i.e., whether more power is being demanded by the loads 102, 104 than the respective DC/DC converter 88 can supply. If the low-voltage battery 32 is not discharging, the process 500 proceeds to a decision block 580.

If the low-voltage battery 32 is discharging, next, in a decision block 570, the computer 36 determines whether the state of charge $SoE_{actual}$ of the low-voltage battery 32 is greater than the charge level $SoE_{OLS}$. In response to the state of charge $SoE_{actual}$ being greater than the charge level $SoE_{OLS}$, the process 500 returns to the block 530 to continue monitoring the state of charge $SoE_{actual}$ of the low-voltage battery 32.

In response to the state of charge $SoE_{actual}$ being less than the charge level $SoE_{OLS}$, next, in a block 575, the computer 36 performs the operational load shedding strategy. The computer 36 reduces energy supplied to a plurality of loads 102, 104, e.g., the sheddable loads 102, by the low-voltage battery 32. The computer 36 may reduce the energy supplied to a load to a positive amount, e.g., running the fan 108 at a lower-than-typical speed, or the computer 36 may reduce the energy supplied to a load to zero. The operational load shedding strategy may be tiered, i.e., at one value for the state of charge $SoE_{actual}$, the computer 36 reduces the energy supplied to some sheddable loads 102, and at a second, lower value for the state of charge $SoE_{actual}$, the computer 36 either reduces the energy supplied to additional sheddable loads 102 or further reduces the energy supplied to the same sheddable loads 102. Which sheddable loads 102 are included in the operational load shedding strategy and the values of the state of charge $SoE_{actual}$ at which the energy supplied to those sheddable loads 102 is reduced are chosen by balancing the potential future draws on the low-voltage battery 32 and the avoidance of customer dissatisfaction from perceptible loss of convenience features. After the block 575, the process 500 returns to the block 530 to continue monitoring the state of charge $SoE_{actual}$ of the low-voltage battery 32.

If the low-voltage battery 32 is not discharging, after the decision block 565, in a decision block 580, the computer 36 checks whether the operational load shedding strategy is currently active. If the operational load shedding strategy is not active, the process 500 returns to the block 530 to continue monitoring the state of charge $SoE_{actual}$ of the low-voltage battery 32.

If the operational load shedding strategy is active, next, in a block 585, the computer 36 disables the operational load shedding strategy, i.e., permits full energy to be supplied to all the loads 102, 104 by the low-voltage battery 32.

Next, in a decision block 590, the computer 36 determines whether the state of charge $SoE_{actual}$ of the low-voltage battery 32 is greater than the charge level $SoE_{OLS}$. In response to the state of charge $SoE_{actual}$ being greater than the charge level $SoE_{OLS}$, the process 500 returns to the block 530 to continue monitoring the state of charge $SoE_{actual}$ of the low-voltage battery 32.

In response to the state of charge $SoE_{actual}$ being less than the charge level $SoE_{OLS}$, next, in a block 595, the computer 36 recharges the low-voltage battery 32, either initiating or continuing the recharging, and the computer 36 maintains the operational load shedding strategy as active.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A system for a vehicle comprising:
a low-voltage battery electrically coupled to a powertrain; and
a computer programmed to put the vehicle in a minimal risk condition in response to a state of charge of the low-voltage battery falling below a first threshold, reduce energy supplied to a plurality of loads by the low-voltage battery in response to the state of charge of the low-voltage battery falling below a second threshold, recharge the low-voltage battery in response to the state of charge of the low-voltage battery falling below a third threshold;
wherein the second threshold is greater than the first threshold; and
the third threshold is greater than the second threshold.

2. The system of claim 1, wherein putting the vehicle in a minimal risk condition includes driving the vehicle to a halt at a roadside.

3. The system of claim 1, wherein the first threshold is equal to at least a sum of a total energy to complete a worst-case minimal risk condition and a minimum energy at which the low-voltage battery can supply the vehicle for the worst-case minimal risk condition.

4. The system of claim 1, further comprising the powertrain.

5. The system of claim 4, further comprising a DC/DC converter electrically coupled to the powertrain and to the low-voltage battery.

6. The system of claim 4, further comprising a high-voltage battery electrically coupled to the powertrain.

7. A computer comprising a processor and a memory storing processor-executable instructions, the processor programmed to:
put a vehicle in a minimal risk condition in response to a state of charge of a battery falling below a first threshold;
reduce energy supplied to a plurality of loads by the low-voltage battery in response to the state of charge of the low-voltage battery falling below a second threshold; and
recharge the low-voltage battery in response to the state of charge of the low-voltage battery falling below a third threshold;
wherein the battery is a low-voltage battery electrically connected to a powertrain of the vehicle;
the second threshold is greater than the first threshold; and
the third threshold is greater than the second threshold.

8. The computer of claim 7, wherein putting the vehicle in a minimal risk condition includes driving the vehicle to a halt at a roadside.

9. The computer of claim 7, wherein the first threshold is equal to at least a sum of a total energy to complete a worst-case minimal risk condition and a minimum energy at which the low-voltage battery can supply the vehicle for the worst-case minimal risk condition.

10. A method comprising:
putting a vehicle in a minimal risk condition in response to a state of charge of a battery falling below a first threshold;
reducing energy supplied to a plurality of loads by the low-voltage battery in response to the state of charge of the low-voltage battery falling below a second threshold; and
recharging the low-voltage battery in response to the state of charge of the low-voltage battery falling below a third threshold;
wherein the battery is a low-voltage battery electrically connected to a powertrain of the vehicle;

the second threshold is greater than the first threshold; and
the third threshold is greater than the second threshold.

11. The method of claim 10, wherein putting the vehicle in a minimal risk condition includes driving the vehicle to a halt at a roadside.

12. The method of claim 10, wherein the first threshold is equal to at least a sum of a total energy to complete a worst-case minimal risk condition and a minimum energy at which the low-voltage battery can supply the vehicle for the worst-case minimal risk condition.

* * * * *